United States Patent
Harper et al.

(10) Patent No.: US 7,770,064 B2
(45) Date of Patent: Aug. 3, 2010

(54) RECOVERY OF APPLICATION FAULTS IN A MIRRORED APPLICATION ENVIRONMENT

(75) Inventors: Richard Edwin Harper, Chapel Hill, NC (US); Dinesh Kumar Subhraveti, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 11/868,455

(22) Filed: Oct. 5, 2007

(65) Prior Publication Data

US 2009/0094478 A1   Apr. 9, 2009

(51) Int. Cl.
  *G06F 11/00*  (2006.01)
(52) U.S. Cl. .......................................... 714/15
(58) Field of Classification Search ........................ None
  See application file for complete search history.

(56) References Cited

U.S. PATENT DOCUMENTS

| | | | |
|---|---|---|---|
| 5,095,421 A | | 3/1992 | Freund |
| 5,129,080 A | | 7/1992 | Smith |
| 5,285,528 A | | 2/1994 | Hart |
| 5,502,840 A | | 3/1996 | Barton |
| 5,590,277 A | * | 12/1996 | Fuchs et al. ................. 714/38 |
| 5,790,851 A | | 8/1998 | Frank et al. |
| 5,805,790 A | | 9/1998 | Nota et al. |
| 5,815,651 A | | 9/1998 | Litt |
| 5,966,543 A | | 10/1999 | Hartner et al. |
| 6,003,066 A | | 12/1999 | Ryan et al. |
| 6,625,635 B1 | | 9/2003 | Elnozahy |
| 6,625,751 B1 | | 9/2003 | Starovic et al. |
| 6,769,073 B1 | * | 7/2004 | Shapiro ....................... 714/11 |
| 6,772,367 B1 | * | 8/2004 | Tarafdar et al. ............... 714/11 |
| 6,792,497 B1 | | 9/2004 | Gold et al. |
| 6,832,367 B1 | | 12/2004 | Choi et al. |
| 6,851,075 B2 | | 2/2005 | Ur et al. |
| 6,866,162 B2 | | 3/2005 | Morris, Sr. |
| 6,920,634 B1 | | 7/2005 | Tudor |
| 6,961,865 B1 | * | 11/2005 | Ganesh et al. ................. 714/2 |
| 7,062,583 B2 | | 6/2006 | Kolinummi et al. |
| 7,185,236 B1 | | 2/2007 | Moser et al. |
| 7,206,964 B2 | | 4/2007 | Moser et al. |

(Continued)

FOREIGN PATENT DOCUMENTS

WO    2006077261 A2    7/2006

OTHER PUBLICATIONS

U.S. Patent Application entitled "Monitoring Patterns of Processes Accessing in a Storage Device to Determine Access Parameters to Apply", Ser. No. unknown, filed Oct. 5, 2007, by inventors P. Sarkar and D.K. Subhraveti.

(Continued)

*Primary Examiner*—Michael C Maskulinski
(74) *Attorney, Agent, or Firm*—David W. Victor; Konrad Raynes and Victor LLP

(57) ABSTRACT

Provided are a method, system, and article of manufacture for recovery of application faults in a mirrored application environment. Application events are recorded at a primary system executing an instruction for an application. The recorded events are transferred to a buffer. The recorded events are transferred from the buffer to a secondary system, wherein the secondary system implements processes indicated in the recorded events to execute the instructions indicated in the events. An error is detected at the primary system. A determination is made of a primary order in which the events are executed by processes in the primary system. A determination is made of a modified order of the execution of the events comprising a different order of executing the events than the primary order in response to detecting the error. The secondary system processes execute the instructions indicated in the recorded events according to the modified order.

25 Claims, 5 Drawing Sheets

U.S. PATENT DOCUMENTS

| | | | |
|---|---|---|---|
| 7,240,057 | B2 | 7/2007 | Kingsbury et al. |
| 2002/0013802 | A1 | 1/2002 | Mori et al. |
| 2002/0083149 | A1 | 6/2002 | Van Huben et al. |
| 2004/0177130 | A1 | 9/2004 | Chambliss et al. |
| 2004/0236990 | A1* | 11/2004 | Pavlik et al. ............... 714/15 |
| 2005/0071760 | A1 | 3/2005 | Jaeger |
| 2005/0149634 | A1 | 7/2005 | McKenney |
| 2005/0177821 | A1 | 8/2005 | Ogata et al. |
| 2005/0251794 | A1 | 11/2005 | Taylor et al. |
| 2005/0262411 | A1 | 11/2005 | Vertes et al. |
| 2006/0085784 | A1 | 4/2006 | Traut et al. |
| 2006/0136640 | A1 | 6/2006 | Tuan |
| 2006/0143512 | A1 | 6/2006 | Jia et al. |
| 2006/0184935 | A1 | 8/2006 | Abels et al. |
| 2009/0119549 | A1 | 5/2009 | Vertes |

OTHER PUBLICATIONS

U.S. Patent Application entitled "Varying Access Parameters for Processes to Access Memory Addresses in Response to Detecting a Condition Related to a Pattern of Processes Access to Memory Addresses", Serial No. unknown, filed Oct. 5, 2007, by inventors P. Sarhar and D.K. Subhraveti.

U.S. Patent Application entitled "Providing a Process Exclusive Access to a Page Including a Memory Address to Which a Lock is Granted to the Process", Serial No. unknown, filed Oct. 5, 2007, by inventors P. Bergheaud, D.K. Subhraveti and M.P. Vertes.

Bergheaud, et al., "Fault Tolerance in Multiprocessor Systems Via Application Cloning", 27th International Conference on Distributed Computing Systems, 2007, pp. 1-10.

Christiaens, et al., "Record/Replay in the Presence of Benign Data Races", 2002, pp. 1-7.

Daniel, et al., "Transparent Process Replication", 2000, pp. 1-6.

Dunlap, et al., "ReVirt: Enabling Intrusion Analysis Through Virtual-Machine Logging and Replay", Proceedings of the 2002 Symposium on Operating Systems Design and Implementation (OSDI), 2002, pp. 1-14.

He, et al., "Preemption Adaptivity in Time-Published Queue-Based Spin Locks", Dept. of Computer Science University of Rochester, NY, 2005, pp. 1-12.

Huangs, et al., "Handling Catastrophic Failures in Scalable Internet Applications", IEEE, 2004, pp. 1-7.

Krammer et al., "MARMOT: An MPI Analysis and Checking Tool", High Performance Computer Center Stuttgart, Germany, 2004, pp. 1-6.

Kranzmuller, "Event Graph Analysis for Debugging Massively Parallel Programs", Dept. for Graphics and Parallel Processing Joh. Kepler University Linz, Austria, Sep. 2000, pp. 1-344.

Lim, "Reactive Synchronization Algorithms for Multiprocessors", Massachusetts Institute of Technology, 1995, pp. 1-162.

Marathe, et al., "Composite Abortable Locks", IEEE, 2006, pp. 1-10.

Mellor-Crummey, et al., "A Software Instruction Counter", ACM, 1989, pp. 78-86.

Osman et al., "The Design and Implementation of Zap: A System for Migrating Computing Environments", Proceedings of the 5th Symposium on Operating Systems Design and Implementation (OSDI 2002), Dec. 2002, pp. 1-16.

Russinovich, et al., "Operating System Support for Replay of Concurrent Non-Deterministic Shared Memory Applications", Dept. of Computer Science University of Oregon, 1996, pp. 1-5.

Slye, et al., "Support for Software Interrupts in Log-Based Rollback-Recovery", 26th Symposium on Fault-Tolerant Computer Systems, Jun. 1996, pp. 1-20.

* cited by examiner

Event

Address Lock Information

RECOVERY OF APPLICATION FAULTS IN A MIRRORED APPLICATION ENVIRONMENT

BACKGROUND OF THE INVENTION

1. Field of the Invention

The present invention relates to a method, system, and article of manufacture for recovery of application faults in a mirrored application environment.

2. Description of the Related Art

Application processes may concurrently access memory addresses in a shared memory. A process may comprise one or more threads allocated processor and computer resources to execute computer instructions. Multiple processes or multiple threads in one process may concurrently execute instructions for one application, or multiple processes may concurrently execute instructions for multiple applications. Multiple processes may execute on multiple processors. The term "process" as used herein refers to a process, thread or any other unit of execution allocated to execute instructions. To access the memory addresses, the processes must obtain a spinlock for each address. If the spinlock is not available or granted to another process, then the process must repeatedly check until the spinlock becomes available. Application processes may experience an execution error based on a non-deterministic pattern of accesses. For instance, a certain non-deterministic access pattern of requests for memory addresses may result in a deadlock or other locking errors due to a race condition. A race condition occurs when separate processes or threads of execution depend on some shared state. A deadlock refers to a specific condition when two or more processes, such as in a multi-processor environment, are each waiting for the process to release a shared resource, such as a lock for a resource, or more than two processes are waiting for resources in a circular chain.

In a mirrored application environment, a secondary system may mirror application operations occurring in a primary system so that in the event of a failure at the primary system, the application may continue executing at the secondary system. However, errors that occur at the primary system may be replicated at the secondary system.

There is a need in the art for improved techniques for mirroring application operations at a secondary system.

SUMMARY

Provided are a method, system, and article of manufacture for recovery of application faults in a mirrored application environment. Application events are recorded at a primary system executing an instruction for an application. The recorded events are transferred to a buffer. The recorded events are transferred from the buffer to a secondary system, wherein the secondary system implements processes indicated in the recorded events to execute the instructions indicated in the events. An error is detected at the primary system. A determination is made of a primary order in which the events are executed by processes in the primary system. A determination is made of a modified order of the execution of the events comprising a different order of executing the events than the primary order in response to detecting the error. The secondary system processes execute the instructions indicated in the recorded events according to the modified order.

In a further embodiment, the recorded events in the buffer are transferred in the primary order to the secondary system if no modified order is determined to cause the secondary system processes to execute the events in the primary order. The recorded events in the buffer are transferred in the modified order in response to determining the modified order to cause the secondary system processes to execute the events in the modified order.

In a further embodiment, a determination is made as to whether the error is of a type that will not be replicated in the secondary system if the secondary system processes execute the events in the primary order. The modified order is determined in response to determining that the error is of the type that will not be replicated in the secondary system if the secondary system executes the events in the primary order. The secondary system processes execute the recorded events in the primary order in response to determining that the error is of the type that will not be replicated in the secondary system if the events are executed in the primary order.

In a further embodiment, the buffering of the recorded events executed in the primary system delays the transfer of the recorded events to the secondary system and the execution of the instructions indicated in the recorded events by the secondary system processes.

In a further embodiment, a determination is made, in response to detecting the error, events comprising processes in the primary system executing instructions that access a primary shared resource at the primary system in a manner that resulted in the error. The determined modified order and the primary order comprise orders of the execution of events related to accessing the shared resource. Executing the events at the primary system causes accessing of a secondary shared resource at the secondary system replicating the primary shared resource.

In a further embodiment, the modified order comprises an order for executing the events in the secondary system in a manner that will not result in the detected error. The order of execution of the events indicated in the buffer is updated to reflect the determined modified order.

In a further embodiment, the detected error comprises a deadlock with respect to the shared resource. The secondary system processes executing the recorded instructions in the determined modified order avoids the deadlock.

In a further embodiment, in response to executing an event at the primary system, a graph is updated indicating resource dependency relationships indicating one process holding a lock representing the shared resource and other processes waiting for the process holding the lock to release the lock in order to access the shared resource. The determination of the events whose access of the shared resource resulted in the error comprises processing the graph to determine a cycle of processes in the graph indicating a deadlock. The modified order comprises an ordering of the processes accessing the shared resources that will not result in the cycle indicated in the graph.

In a further embodiment, the primary and secondary systems implement the processors to separately execute the application. A determination is made as to whether the error is a fatal error that will result in the primary system being taken offline. An operation to failover to use the secondary system executing the buffered events in response to determining that the error is the fatal error. The clients direct application requests to the secondary system executing the application in response to the failing over operation.

DETAILED DESCRIPTION

Figure 1:
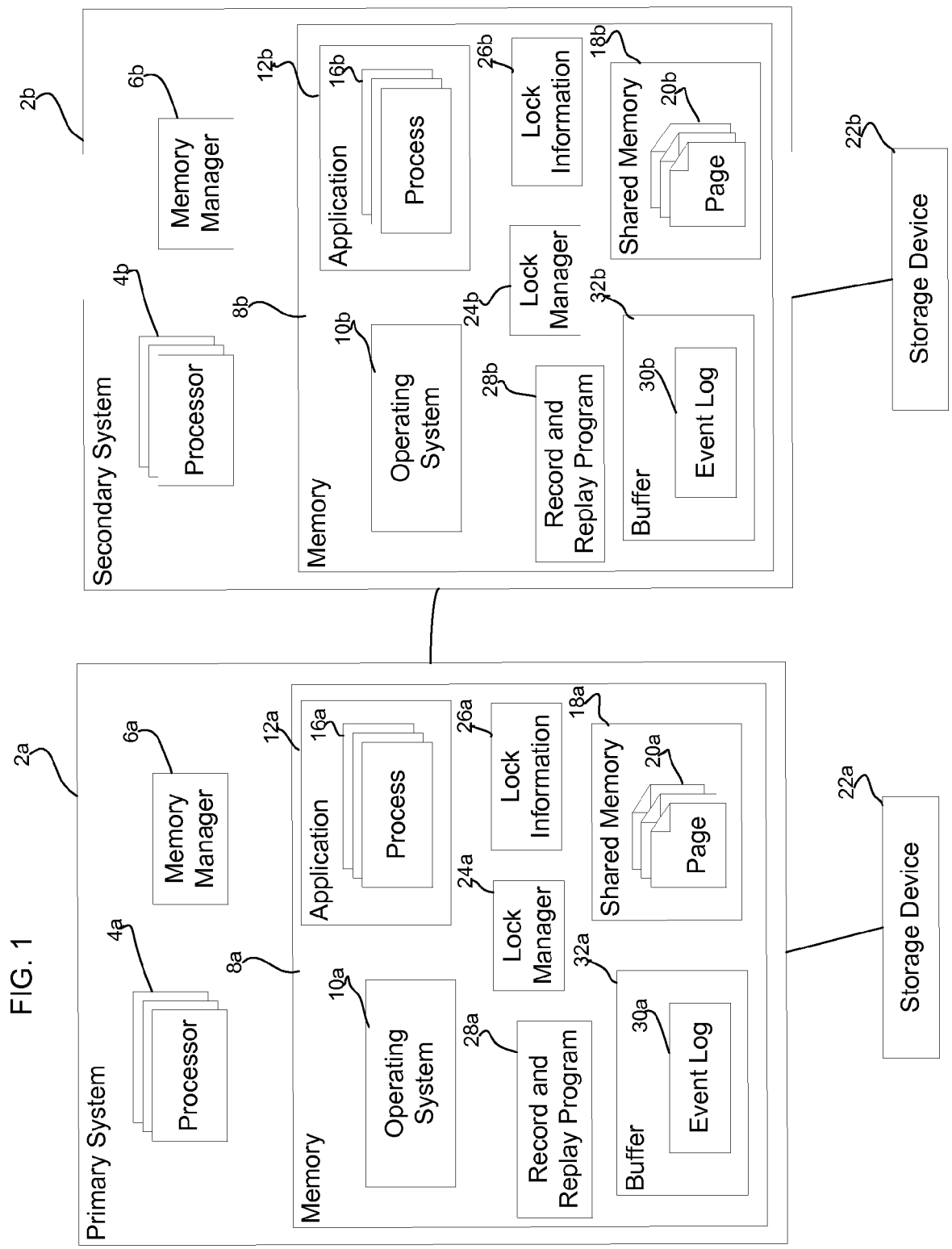
FIG. 1 illustrates an embodiment of a computing environment.

FIG. 1 illustrates an embodiment of a computing environment. Two coupled systems 2a and 2b each include multiple processors 4a and 4b and a memory manager 6a and 6b managing access to a memory 8a and 8b. The processors 4a and 4b load into their respective memory 8a and 8b an operating system 10a and 10b providing a runtime environment for one or more applications 12a and 12b. The primary system 2a and secondary system 2b may execute the same applications 12a, 12b, so that the secondary system 2b can mirror the execution of one or more applications 12a executed in the primary system 2a. An operating system scheduler 14a and 14b may spawn processes 16a and 16b that execute instructions implementing the application 12 operations. The processes 16a and 16b may comprise processes, threads, other units of executions allocated by the operating system 10a and 10b, etc. The processes 16a and 16b may be executed by one or more of the processors 4a and 4b and may concurrently access a shared memory 18a and 18b. The shared memory 18a and 18b includes pages 20a and 20b. The memory managers 6a and 6b may map received virtual addresses used by the operating system 10a and 10b and processes 16a and 16b to addresses in one of the pages 20a and 20b. The data in the pages 20a and 20b may include data accessed by application processes 16a and 16b and data from storage 22a and 22b coupled to the systems 2a and 2b, respectively. Pages 20a and 20b may be stored in the shared memory 18a and 18b or swapped to the storage 22a and 22b if there is not sufficient space for all the pages 20a and 20b in the memory 18a and 18b.

If a process 16a, 16b references a memory address that resolves within a page 20a, 20b that is not available in the shared memory 18a, 18b, then the memory manager 6a, 6b generates a page fault to the respective operating system 10a, 10b to cause the respective operating system 10a, 10b to load the required page 20a, 20b from a paging file in the storage 22a, 22b.

If a process 16a, 16b requires access to a memory address in a page 20a, 20b to write to the page 20a, 20b, then the operating system 10a, 10b would invoke a respective lock manager 24a, 24b to determine if the memory address is available for an exclusive lock. The lock manager 24a, 24b checks respective lock information 26a, 26b to determine whether to grant a lock for the process 16a, 16b requesting access to the memory address. If the lock is granted, then the process 16a, 16b may write to the memory address.

A record and replay program 28a and 28b may record events that occur with respect to an application 12a and 12b executing in the system 2a, 2b, respectively. The recorded events may be stored in an event log 30a, 30b in a buffer 32a, 32b. In one embodiment, the record and replay program 28a in the primary system 2a may transfer the event log 30a to the secondary system 2a so that the record and replay program 28b in the secondary system executes the recorded events in the event log 30a in the order in which the events are indicated in the log 30a to replay the application 12a events that occur at the primary system 2a in the secondary system 2b.

In this way, if there is a failure at the primary system 2a, then a failover may occur to the secondary system 2b to have the secondary system 2b execute the one or more applications 12b so that the applications 12a executing on the failed primary system 2a may continue to execute in corresponding applications 12b in the secondary system 2b. After executing all transferred buffered events in the event log 30a transferred from the primary system 2a, the record and replay program 28b in the secondary system 2b may start logging events in the event log 30b so that after recovery of the primary system 2a, application operations may failback to the primary system 2a. Failback may include the secondary record and replay program 28b transferring the event log 30b to the primary system 2a record and replay program 28a to execute.

In one embodiment, the lock manager 24a, 24b operations may be performed outside of the kernel space of the operating system 10a, 10b and execute within the application space without intervention from the operating system 10a, 10b or hardware. For instance, if the lock manager 24a, 24 is granting spinlocks to processes 16a, 16b, then the lock manager 24a, 24b operations and spinlocks may be maintained within the user application space. Upon receiving a spinlock for a memory address in the shared memory 18a, 18b, the requesting process 16a, 16b receiving the spinlock would access the resource covered by the spinlock. If another process 16a, 16b tries to access the resource covered by a granted spinlock, then that process 16a, 16b will retry the request after a predefined period until the spinlock is acquired. In alternative embodiments, the lock manager 24a, 24 may operate within the operating system 10a, 10b kernel space and grant lock types other than spinlocks.

Figure 2:
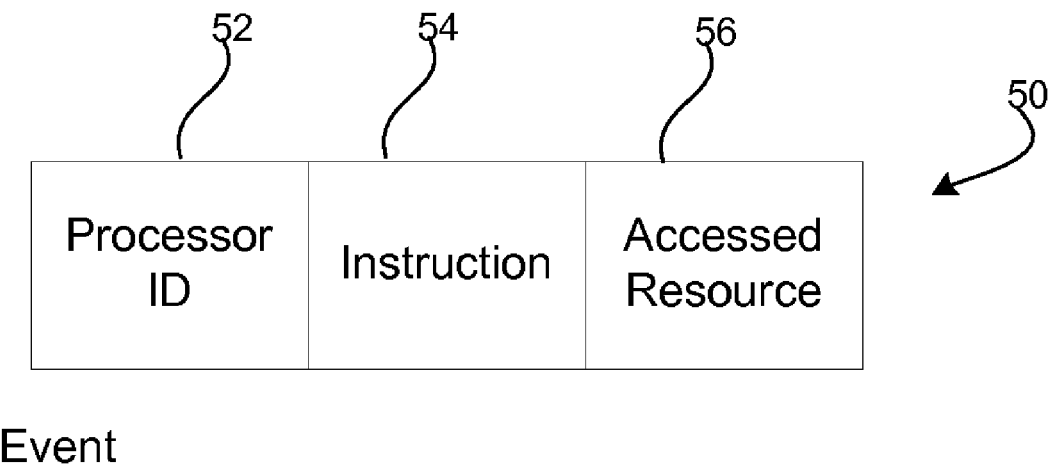
FIG. 2 illustrates an embodiment of event information.

FIG. 2 illustrates an embodiment of an event 50 indicated in the event log 30a, 30b, including a processor identifier (ID) 52 of a processor executing an instruction 54. The instruction 54 may access an indicated shared resource 56. Alternatively, the instruction 54 may perform an operation unrelated to accessing a shared resource. The event may comprise system calls, application operations, and accesses to the shared memory 18a, 18b.

Figure 3:
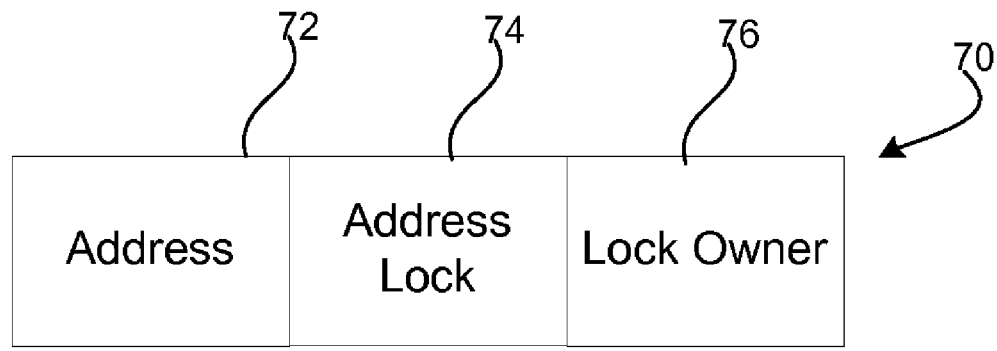
FIG. 3 illustrates an embodiment of address lock information.

FIG. 3 illustrates an embodiment of lock address information 70 maintained in the lock information 26a, 26b for each memory address that may be accessed in a page 20. The lock address information 70 indicates a memory address 72 for which the lock information applies, such as a virtual address; an address lock 74 indicates whether a lock, e.g., spinlock, etc., is held for the address; and a lock owner 76 indicates the process 16 holding the lock 56 for the address.

Figure 4:
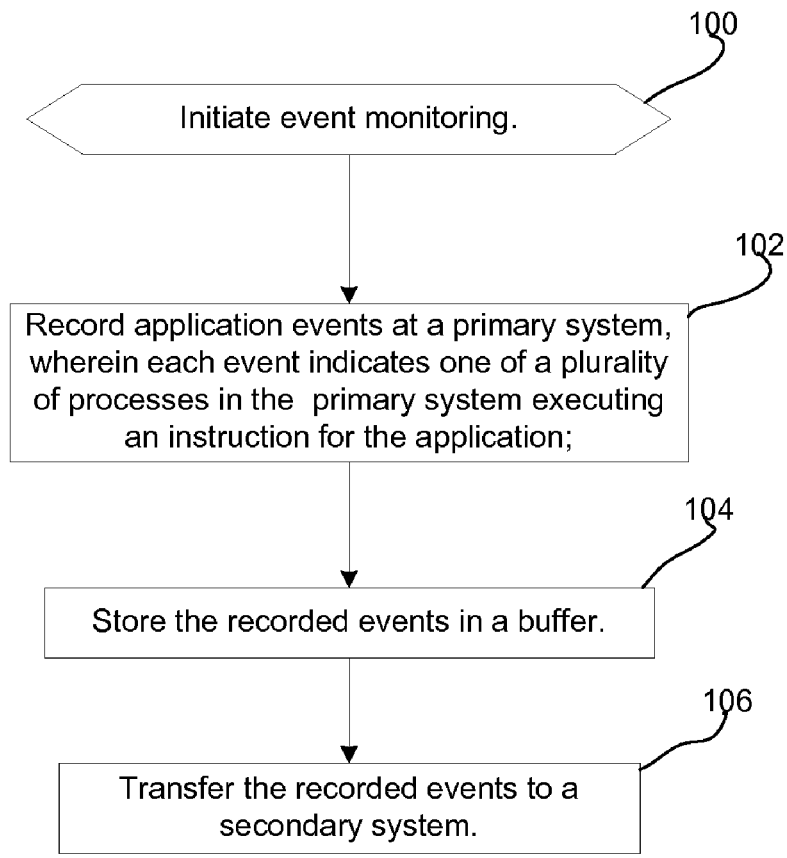
FIG. 4 illustrates an embodiment of event monitoring.

FIG. 4 illustrates an embodiment of operations performed by the primary record and replay program 28a at the primary system 2a (or the secondary record and replay program 28b in the event of a failover) to monitor events. In certain embodiments, the primary record and replay program 28a may only monitor events with respect to specific applications 12a running at the primary system 2a, and not all applications and processes running in the primary system 2a. Upon initiating (at block 100) event monitoring, the record and replay program 28a records (at block 102) application events 50 at the primary system 2a in the event log 30a and stores (at block 104) the event log 30a in the buffer 32a. Periodically, the primary record and replay program 28a transfers (at block 106) the event log 30a to the secondary system 2b. By delaying the transfer of the event log 30a to the secondary system 2b a delay is introduced from the time events 50 are executed in the primary system 2a and when they are transferred and executed in the secondary system 2b. This introduced delay before the secondary system 2b replays the events introduces a time period during which an error occurring at the primary system 2a may be detected and the order of the events in the event log 30a reordered to avoid the error at the secondary system 2b, if the error may be prevented by reordering the order of event execution.

Figure 5:
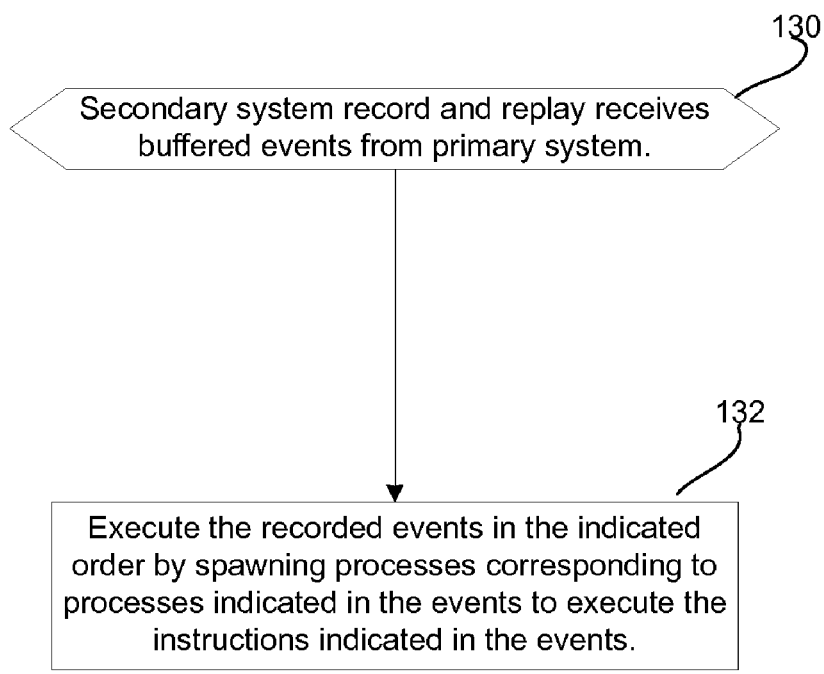
FIG. 5 illustrates an embodiment of secondary system operation to mirror application execution in a primary system.

FIG. 5 illustrates an embodiment of operations performed by the record and replay program 28b in the secondary system 2b upon receiving the event log 30a from the primary system 2a (or the primary record and replay program 28 when failing back to the primary system 2a after failback to the secondary system 2b). Upon the secondary record and replay program 28b receiving (at block 130) buffered events 50 in the event log 30a from the primary system 2a, the secondary record and replay program 28b executes (at block 132) the recorded events 50 in the order indicated in the event log 30a by spawning processes 16b corresponding to processes 16a indicated in the logged events 30a to execute the instructions indicated in the events in the received event log 30a.

Figure 6:
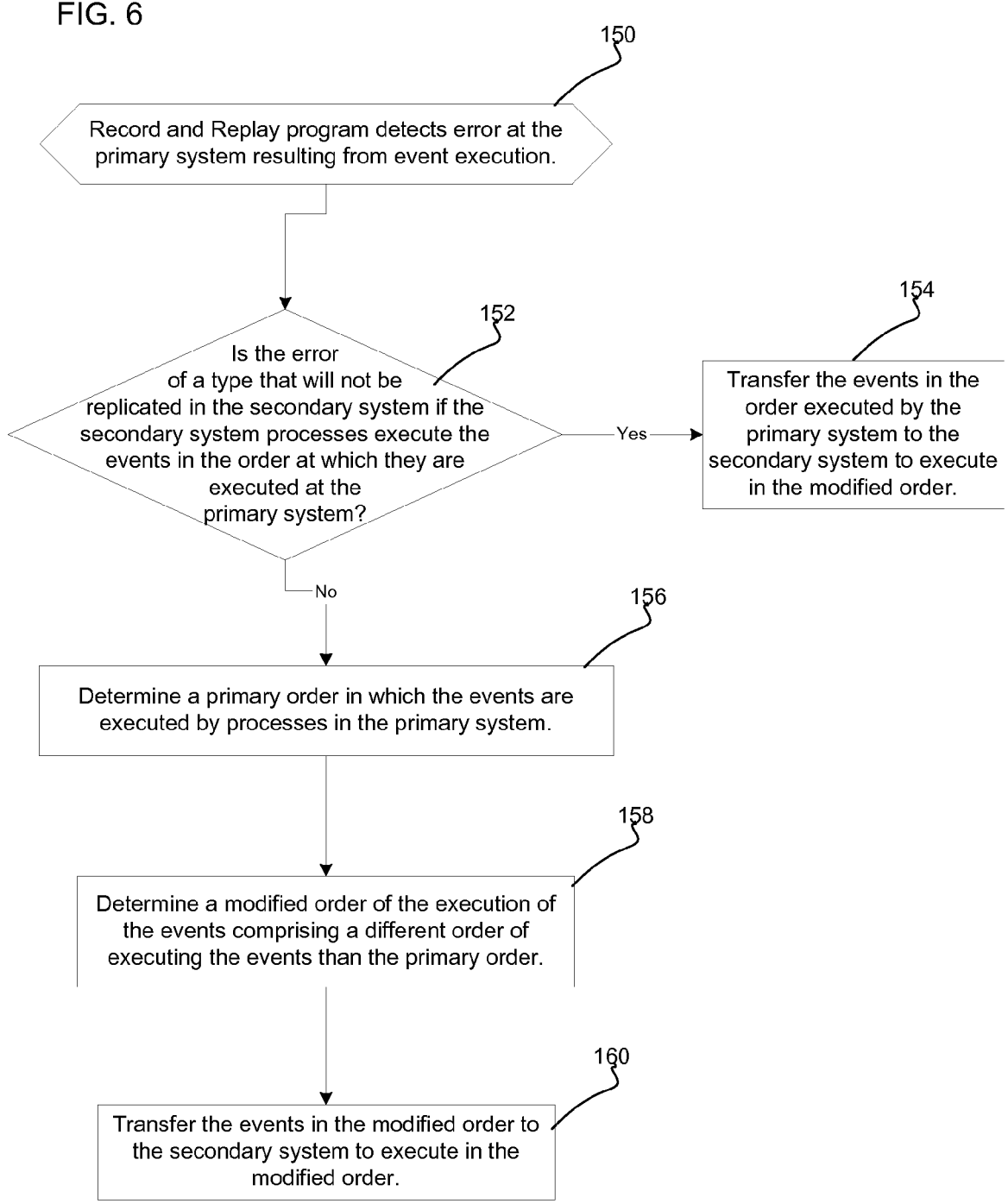
FIGS. 6 and 7 illustrate embodiments of operations to detect and handle an error during execution of an instruction at the primary system that is to be transferred to the secondary system to execute.

FIG. 6 illustrates an embodiment of operations implemented in the primary record and replay program 28a in the primary system 2a (or the secondary record and replay program 28b in the event of a failover) to handle an error resulting from execution of the recorded events. Upon detecting (at block 150) an error resulting from the executed events 50, the record and replay program 28a determines (at block 152) whether the error is of a type that will not be replicated in the secondary system 2b if the secondary system processes 16b execute the events in the order at which they are executed at the primary system 2a. For instance, certain errors may be the result of a lack of system resources, failed memory allocations, etc., at the primary operating system 10a due to other applications and operations executing at the primary system 2a. The secondary system 2b may not have the resource allocation problems experienced at the primary system 2a because the secondary system 2b may not be running the same ancillary operations unrelated to the monitored application 12a events as the primary system 2a. Thus, when the secondary system 2b executes the logged events 50 for the monitored application, the error specific to the primary system 2a environment may not be replicated on the secondary system 2b.

If (at block 152) the detected error is of the type that will not be replicated at the secondary system 2b, then the events in the event log 30a are transferred (at block 154) in the order in which the events are executed by the primary system 2 to the secondary system. In such case, the secondary system 2b would execute the events in the transferred event log 30a in the order in which they were executed by the processes 16a in the primary system 2a.

If (at block 152) the error is of the type that may be replicated at the secondary system 2b if the secondary system 2b executes the events in the same order, then the primary record and replay program 28a determines (at block 156) a primary order in which the events are executed by processes 16a in the primary system 2a. The primary record and replay program 28a further determines (at block 158) a modified order of the execution of the events 50 in the event log 30a that is a different order of executing the events than the primary order. The primary record and replay program 28a may determine a modified order such that the secondary record and replay program 28b will not experience the error when executing the events in the modified order. The primary record and replay program 28a transfers (at block 160) the events in the event log 30a in the determined modified order to the secondary system 2b to execute in the modified order.

Figure 7:
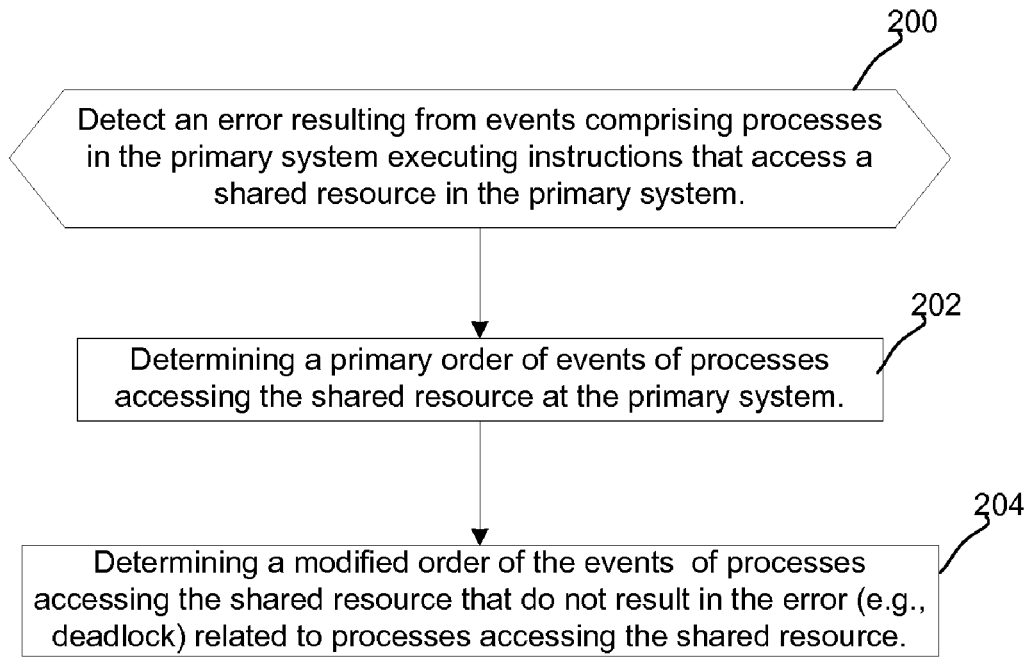

FIG. 7 illustrates an embodiment of operations performed by the primary record and replay program 28a when detecting a deadlock error related to processes 16a accessing a shared resource, such as the shared memory 18a. Upon detecting (at block 200) an error resulting from events comprising processes 16a in the primary system 2a executing instructions that access a shared resource 18a in the primary system 2, such as a deadlock error, the primary record and replay program 28a determines (at block 202) a primary order of events of processes 16a accessing the shared resource 18a at the primary system 2a that resulted in the error. The primary record and replay program 28a determines (at block 204) a modified order of the events of processes 16a accessing the shared resource 18a that do not result in the error (e.g., deadlock) related to processes 16a accessing the shared resource 18a.

Figure 8:
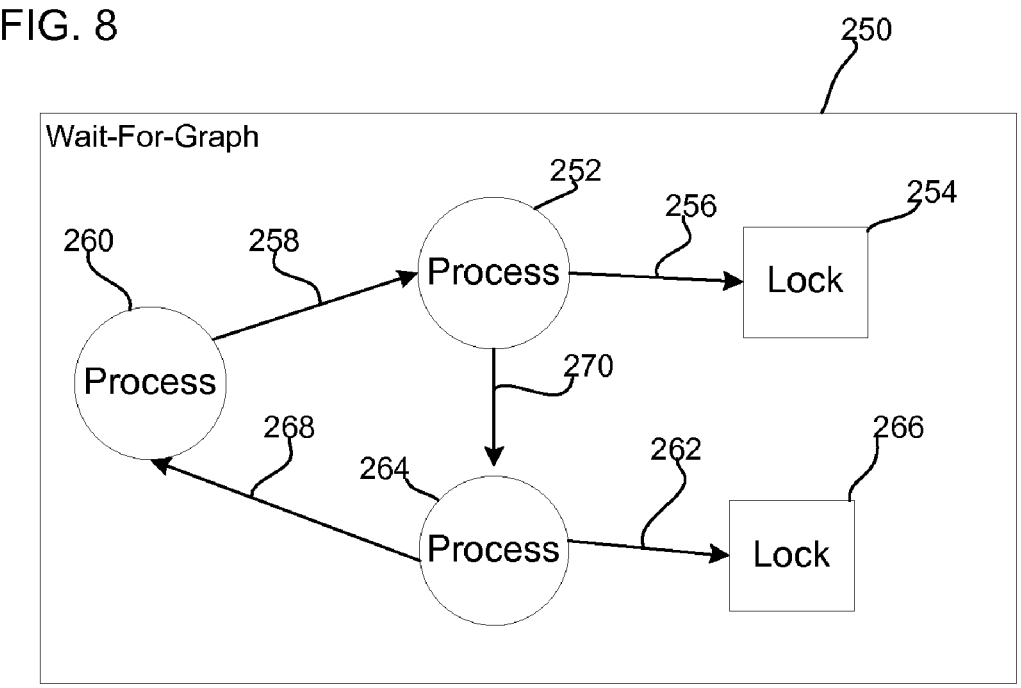
FIG. 8 illustrates an example of a graph indicating resource dependency relationships.

FIG. 8 illustrates an embodiment of a wait-for-graph 250 illustrating a resource dependency relationship of processes 16a accessing shared resources, such as memory address in the shared memory 18a. The wait-for-graph 250 may be maintained by the record and replay programs 28a, 28b in the respective memory 8a, 8b. The wait-for-graph 250 may be processed to determine whether there is a cyclical dependency relationship that would result in a deadlock. The wait-for-graph 250 has process 252 holding a lock 254 representing a shared resource, such as a memory address, where a directed edge 256 represents that process 252 holds the lock 254. Directed edge 258 from process 260 to process 252 indicates that process 260 is waiting for process 252 to release the lock 254. Directed edge 262 from process 264 to lock 266 represents that process 264 is holding lock 266, and edge 268 represents that process 264 is waiting for process 260 to release the lock 254 held by process 252. The wait-for-graph 250 in FIG. 8 shows a cyclical dependency, because edge 270 shows that process 252 is waiting for process 264 to release lock 262, but process 264 cannot release the lock 262 because process 264 is waiting on process 260, which needs lock 254.

In certain embodiments, the primary record and replay program 28a may update the wait-for-graph 250 in memory 8a, 8b whenever processing an event to represent the process 16a accessing or requesting the shared resource. The wait-for-graph 250 may be used to first determine the primary order that resulted in the error, such as the deadlock, and then determine how the order of processes 16a accessing shared resources may be modified to avoid the error. The error may be noted as an order or processor access that results in a cyclical order. The modified order may avoid the cyclical order shown in the graph 250.

Described embodiments provide techniques to implement a record and replay environment to mirror an application's operations at a primary system on a secondary system. Further, the described embodiments provide techniques for monitoring for errors resulting from the execution of events in the primary system. If an error is detected, the described embodiments may determine a modified order of executing the events that would not result in the detected error. The events may be transferred to the secondary system to execute the events in the modified order to avoid the error experienced in the primary system.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the primary record and replay program 28a is described as determining the modified order if an error is detected. In an alternative embodiment, information on a detected error may be provided with the event log 30a to the secondary record and replay program 28b, and then the secondary record and replay program 28b may determine the modified order to use.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIGS. 2 and 3 provide an embodiment of event and lock information. In alternative embodiments, the event and lock information shown in FIGS. 2 and 3 may be arranged in alternative manners and include additional information.

The illustrated operations of FIGS. 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture including code executed in a primary system in communication with a secondary system to perform operations, the operations comprising:
   recording application events at the primary system, wherein each event indicates one of a plurality of processes in the primary system executing an instruction for the application;
   transferring the recorded events to a buffer;
   transferring the recorded events from the buffer to the secondary system, wherein the secondary system implements processes indicated in the recorded events to execute the instructions indicated in the events;
   detecting an error at the primary system;
   determining a primary order in which the events are executed by processes in the primary system; and
   determining a modified order of the execution of the events comprising a different order of executing the events than the primary order in response to detecting the error, wherein the secondary system processes execute the instructions indicated in the recorded events according to the modified order.

2. The article of manufacture of claim 1, wherein the operations further comprise:
   transferring the recorded events in the buffer in the primary order to the secondary system if no modified order is determined to cause the secondary system processes to execute the events in the primary order; and
   transferring the recorded events in the buffer in the modified order in response to determining the modified order to cause the secondary system processes to execute the events in the modified order.

3. The article of manufacture of claim 1, wherein the operations further comprise:
   determining whether the error is of a type that will not be replicated in the secondary system if the secondary system processes execute the events in the primary order, wherein the modified order is determined in response to determining that the error is of the type that will not be replicated in the secondary system if the secondary system executes the events in the primary order, and wherein the secondary system processes execute the recorded events in the primary order in response to determining that the error is of the type that will not be replicated in the secondary system if the events are executed in the primary order.

4. The article of manufacture of claim 1, wherein the buffering of the recorded events executed in the primary system delays the transfer of the recorded events to the secondary system and the execution of the instructions indicated in the recorded events by the secondary system processes.

5. The article of manufacture of claim 1, wherein the operations further comprise:
   determining, in response to detecting the error, events comprising processes in the primary system executing instructions that access a primary shared resource at the primary system in a manner that resulted in the error, wherein the determined modified order and the primary order comprise orders of the execution of events related to accessing the shared resource, and wherein executing the events at the primary system causes accessing of a secondary shared resource at the secondary system replicating the primary shared resource.

6. The article of manufacture of claim 5, wherein the modified order comprises an order for executing the events in the secondary system in a manner that will not result in the detected error, wherein the order of execution of the events indicated in the buffer is updated to reflect the determined modified order.

7. The article of manufacture of claim 6, wherein the detected error comprises a deadlock with respect to the shared resource, wherein the secondary system processes executing the recorded instructions in the determined modified order avoids the deadlock.

8. The article of manufacture of claim 7, wherein the operations further comprise:
   in response to executing an event at the primary system, updating a graph indicating resource dependency relationships indicating one process holding a lock representing the shared resource and other processes waiting for the process holding the lock to release the lock in order to access the shared resource;
   wherein determining the events whose access of the shared resource resulted in the error comprises processing the graph to determine a cycle of processes in the graph indicating a deadlock, wherein the modified order comprises an ordering of the processes accessing the shared resources that will not result in the cycle indicated in the graph.

9. The article of manufacture of claim 1, wherein the primary and secondary systems implement the processors to separately execute the application, wherein the operations further comprise:
   determining whether the error is a fatal error that will result in the primary system being taken offline; and
   failing over to using the secondary system executing the buffered events in response to determining that the error is the fatal error, wherein clients direct application requests to the secondary system executing the application in response to the failing over operation.

10. A system, comprising:
    a primary system including a buffer;
    a secondary system in communication with the primary system;
    code executed by the primary system to perform operations, the operations comprising:
       recording application events at the primary system, wherein each event indicates one of a plurality of processes in the primary system executing an instruction for the application;
       transferring the recorded events to the buffer;
       transferring the recorded events from the buffer to the secondary system, wherein the secondary system implements processes indicated in the recorded events to execute the instructions indicated in the events;
       detecting an error at the primary system;
       determining a primary order in which the events are executed by processes in the primary system; and
       determining a modified order of the execution of the events comprising a different order of executing the events than the primary order in response to detecting the error, wherein the secondary system processes execute the instructions indicated in the recorded events according to the modified order.

11. The system of claim 10, wherein the operations performed by the code executed by the primary system further comprises:
    transferring the recorded events in the buffer in the primary order to the secondary system if no modified order is determined to cause the secondary system processes to execute the events in the primary order; and
    transferring the recorded events in the buffer in the modified order in response to determining the modified order to cause the secondary system processes to execute the events in the modified order.

12. The system of claim 10, wherein the operations performed by the code executed by the primary system further comprises:
    determining whether the error is of a type that will not be replicated in the secondary system if the secondary system processes execute the events in the primary order, wherein the modified order is determined in response to determining that the error is of the type that will not be replicated in the secondary system if the secondary system executes the events in the primary order, and wherein the secondary system processes execute the recorded events in the primary order in response to determining that the error is of the type that will not be replicated in the secondary system if the events are executed in the primary order.

13. The system of claim 10, wherein the buffering of the recorded events executed in the primary system delays the transfer of the recorded events to the secondary system and the execution of the instructions indicated in the recorded events by the secondary system processes.

14. The system of claim 10, wherein the operations performed by the code executed by the primary system further comprises:
determining, in response to detecting the error, events comprising processes in the primary system executing instructions that access a primary shared resource at the primary system in a manner that resulted in the error, wherein the determined modified order and the primary order comprise orders of the execution of events related to accessing the shared resource, and wherein executing the events at the primary system causes accessing of a secondary shared resource at the secondary system replicating the primary shared resource.

15. The system of claim 14, wherein the modified order comprises an order for executing the events in the secondary system in a manner that will not result in the detected error, wherein the order of execution of the events indicated in the buffer is updated to reflect the determined modified order.

16. The system of claim 15, wherein the detected error comprises a deadlock with respect to the shared resource, wherein the secondary system processes executing the recorded instructions in the determined modified order avoids the deadlock.

17. The system of claim 10, wherein the primary and secondary systems implement the processors to separately execute the application, wherein the operations performed by the code executed by the primary system further comprises:
determining whether the error is a fatal error that will result in the primary system being taken offline; and
failing over to using the secondary system executing the buffered events in response to determining that the error is the fatal error, wherein clients direct application requests to the secondary system executing the application in response to the failing over operation.

18. A method, comprising:
recording application events at a primary system, wherein each event indicates one of a plurality of processes in the primary system executing an instruction for the application;
transferring the recorded events to a buffer;
transferring the recorded events from the buffer to a secondary system, wherein the secondary system implements processes indicated in the recorded events to execute the instructions indicated in the events;
detecting an error at the primary system;
determining a primary order in which the events are executed by processes in the primary system; and
determining a modified order of the execution of the events comprising a different order of executing the events than the primary order in response to detecting the error, wherein the secondary system processes execute the instructions indicated in the recorded events according to the modified order.

19. The method of claim 18, further comprising:
transferring the recorded events in the buffer in the primary order to the secondary system if no modified order is determined to cause the secondary system processes to execute the events in the primary order; and
transferring the recorded events in the buffer in the modified order in response to determining the modified order to cause the secondary system processes to execute the events in the modified order.

20. The method of claim 18, further comprising:
determining whether the error is of a type that will not be replicated in the secondary system if the secondary system processes execute the events in the primary order, wherein the modified order is determined in response to determining that the error is of the type that will not be replicated in the secondary system if the secondary system executes the events in the primary order, and wherein the secondary system processes execute the recorded events in the primary order in response to determining that the error is of the type that will not be replicated in the secondary system if the events are executed in the primary order.

21. The method of claim 18, wherein the buffering of the recorded events executed in the primary system delays the transfer of the recorded events to the secondary system and the execution of the instructions indicated in the recorded events by the secondary system processes.

22. The method of claim 18, further comprising:
determining, in response to detecting the error, events comprising processes in the primary system executing instructions that access a primary shared resource at the primary system in a manner that resulted in the error, wherein the determined modified order and the primary order comprise orders of the execution of events related to accessing the shared resource, and wherein executing the events at the primary system causes accessing of a secondary shared resource at the secondary system replicating the primary shared resource.

23. The method of claim 22, wherein the modified order comprises an order for executing the events in the secondary system in a manner that will not result in the detected error, wherein the order of execution of the events indicated in the buffer is updated to reflect the determined modified order.

24. The method of claim 23, wherein the detected error comprises a deadlock with respect to the shared resource, wherein the secondary system processes executing the recorded instructions in the determined modified order avoids the deadlock.

25. The method of claim 18, wherein the primary and secondary systems implement the processors to separately execute the application, further comprising:
determining whether the error is a fatal error that will result in the primary system being taken offline; and
failing over to using the secondary system executing the buffered events in response to determining that the error is the fatal error, wherein clients direct application requests to the secondary system executing the application in response to the failing over operation.

* * * * *